United States Patent
Chang

(10) Patent No.: US 6,981,693 B1
(45) Date of Patent: Jan. 3, 2006

(54) CONTROL SHAFT FOR CERAMIC CONTROL VALVE OF FAUCET

(75) Inventor: Chia-Po Chang, Changhua Hsien (TW)

(73) Assignee: Hain Yo Enterprises Co., Ltd., Lu-Kang (TW)

( * ) Notice: Subject to any disclaimer, the term of this patent is extended or adjusted under 35 U.S.C. 154(b) by 58 days.

(21) Appl. No.: 10/829,108

(22) Filed: Apr. 21, 2004

(51) Int. Cl.
    *F16K 21/00* (2006.01)
(52) U.S. Cl. .................. 251/368; 137/603; 137/801
(58) Field of Classification Search ............. 251/368; 137/603, 801
    See application file for complete search history.

(56) References Cited

U.S. PATENT DOCUMENTS

| | | | |
|---|---|---|---|
| 4,932,438 A | * | 6/1990 | Kitamura et al. ........... 251/368 |
| 5,823,510 A | * | 10/1998 | Muramatsu et al. ........ 251/368 |
| 5,983,938 A | * | 11/1999 | Bowers et al. ............. 137/801 |
| 6,634,380 B2 | * | 10/2003 | Bartkus et al. ............ 137/801 |
| 6,640,357 B1 | * | 11/2003 | Chang ....................... 137/801 |

* cited by examiner

*Primary Examiner*—John Bastianelli
(74) *Attorney, Agent, or Firm*—Alan D. Kamrath; Nikolai & Mersereau, P.A.

(57) ABSTRACT

A control valve of a faucet includes a base, a lower ceramic block, an upper ceramic block, a coupling block, a bottom bushing, an inner barrel, a housing, and a control shaft. The control shaft has a lower end formed with a drive member rested on the inner wall of the inner barrel. The drive member of the control shaft has a peripheral wall formed with a plurality of flattened faces. Thus, the flattened faces of the drive member of the control shaft reduce the friction between the drive member of the control shaft and the inner wall of the inner barrel, so that the control shaft is operated easily and conveniently, thereby facilitating a user operating the faucet.

7 Claims, 5 Drawing Sheets

CONTROL SHAFT FOR CERAMIC CONTROL VALVE OF FAUCET

BACKGROUND OF THE INVENTION

1. Field of the Invention

The present invention primarily relates to a control shaft, and more particularly to a control shaft for a ceramic control valve of a faucet, wherein the control shaft is operated easily and conveniently, thereby facilitating a user operating the faucet.

2. Description of the Related Art

A conventional faucet comprises a main body, a valve seat mounted in the main body, a control shaft having a lower end mounted on the valve seat, and a handle mounted on an upper end of the control shaft. The lower end of the control shaft is formed with a spherical ball close fit in the valve seat. However, the spherical ball of the control shaft is in contact with the valve seat closely and entirely, thereby increasing the friction between the spherical ball of the control shaft and the valve seat, so that the control shaft is not operated smoothly. In addition, impurities are easily accumulated between the spherical ball of the control shaft and the valve seat during a long-term utilization, so that the control shaft is not operated easily and conveniently, thereby causing inconvenience to a user when operating the faucet.

SUMMARY OF THE INVENTION

The primary objective of the present invention is to provide a control shaft for a ceramic control valve of a faucet, wherein the control shaft is operated easily and conveniently, thereby facilitating a user operating the faucet.

Another objective of the present invention is to provide a control shaft for a ceramic control valve of a faucet, wherein the flattened faces are formed on the peripheral wall of the drive member of the control shaft to reduce the friction between the drive member of the control shaft and the inner wall of the inner barrel, so that the control shaft is operated easily and conveniently, thereby facilitating a user operating the control shaft of the control valve.

A further objective of the present invention is to provide a control shaft for a ceramic control valve of a faucet, wherein the control shaft is operated smoothly, so that the control shaft is not easily deformed during a long-term utilization, thereby enhancing the lifetime of the control shaft and the control valve.

In accordance with the present invention, there is provided a control valve of a faucet, comprising:

a base having an inside formed with a water outlet;
a lower ceramic block mounted on the base and having an inside formed with a conducting channel, a cold water inlet and a hot water inlet;
an upper ceramic block mounted on the lower ceramic block and having an inside formed with a conducting opening;
a coupling block mounted on the upper ceramic block;
a bottom bushing mounted on the coupling block;
an inner barrel mounted on the bottom bushing and having an inner wall formed with a through hole;
a housing mounted on the base and enclosed around the inner barrel; and
a control shaft mounted in the inner barrel and having an upper end protruding outward from the through hole of the inner barrel, wherein:
the control shaft has a lower end formed with a drive member rested on the inner wall of the inner barrel; and
the drive member of the control shaft has a peripheral wall formed with a plurality of flattened faces.

Further benefits and advantages of the present invention will become apparent after a careful reading of the detailed description with appropriate reference to the accompanying drawings.

DETAILED DESCRIPTION OF THE INVENTION

Figure 1:
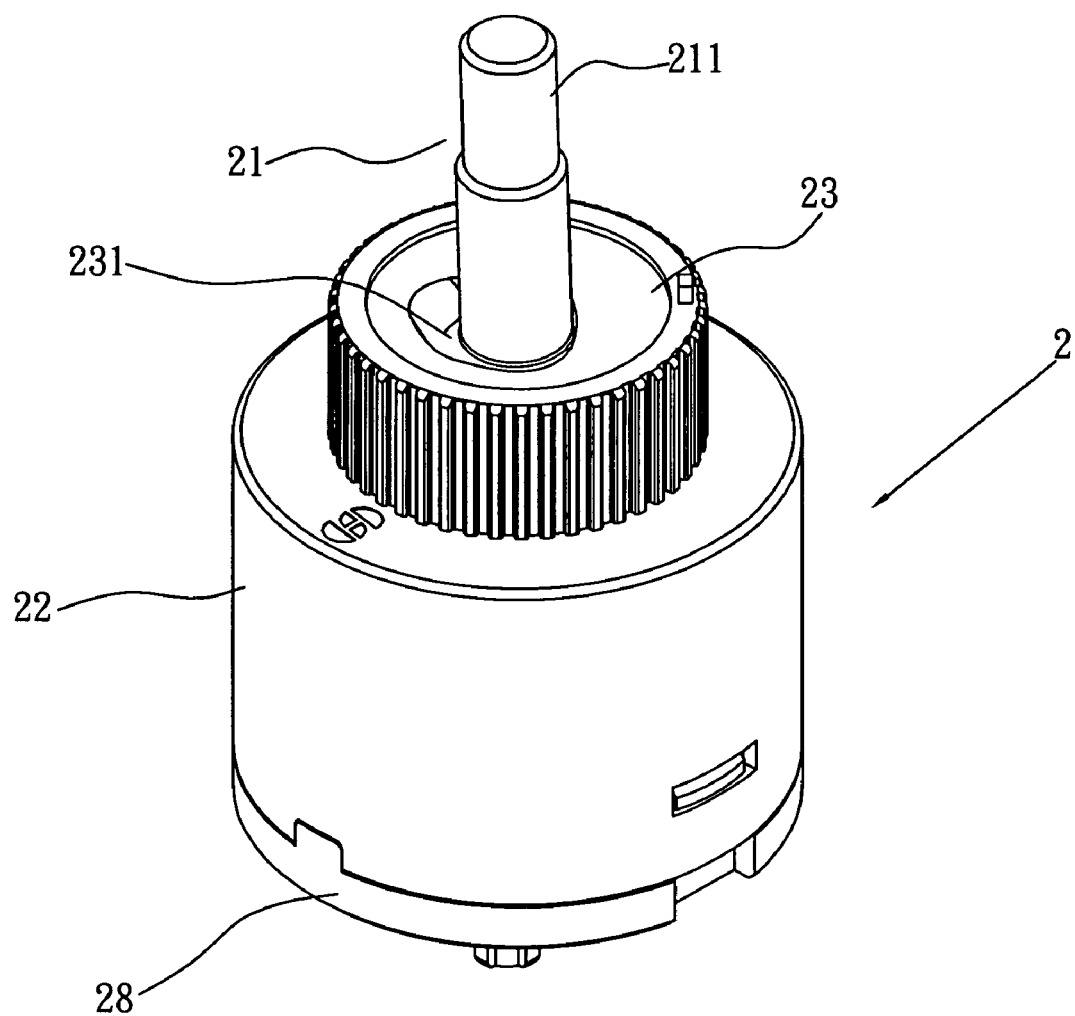
FIG. 1 is a perspective view of a control valve of a faucet in accordance with the preferred embodiment of the present invention.
Figure 2:
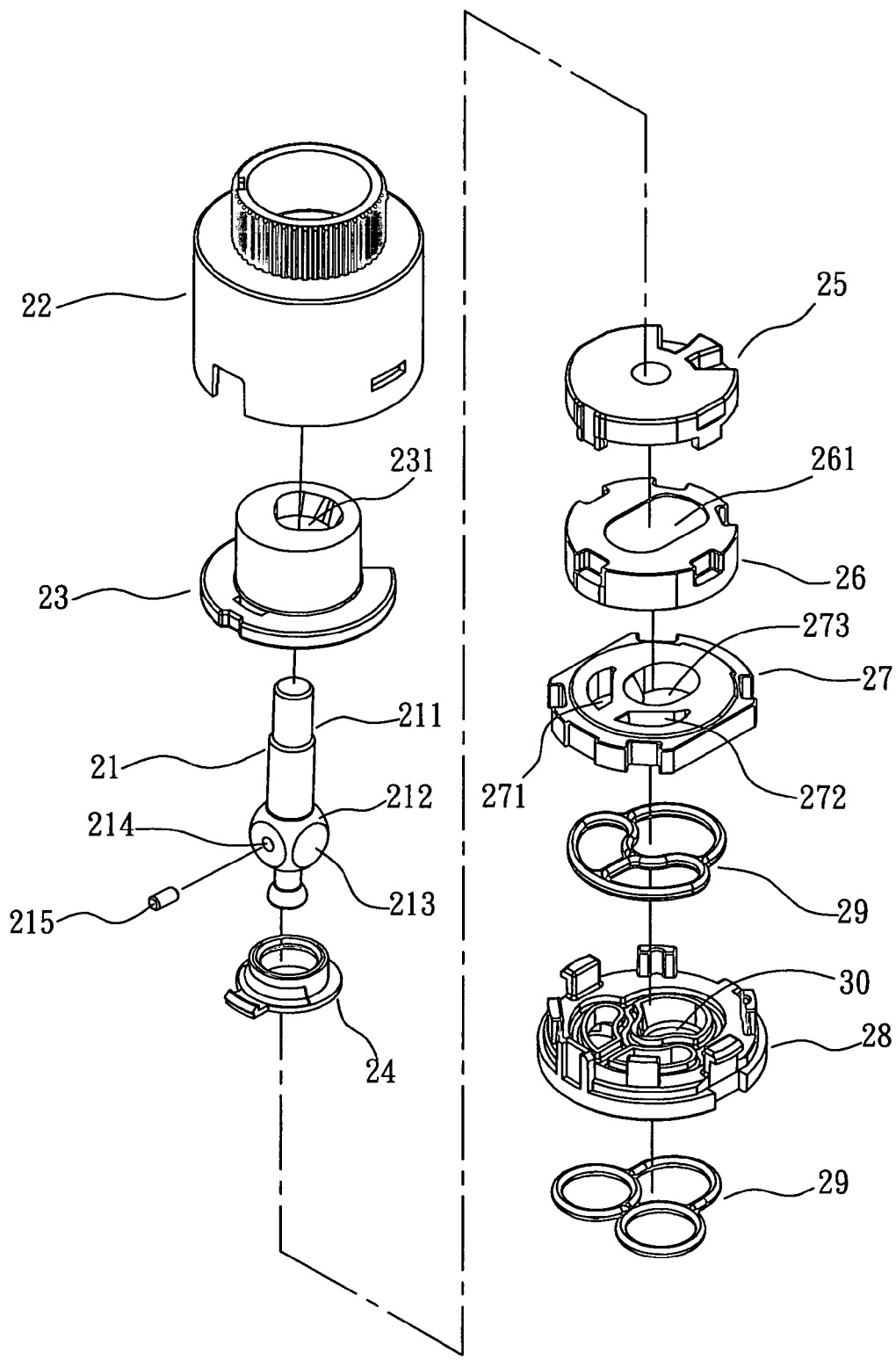
FIG. 2 is an exploded perspective view of the control valve as shown in FIG. 1.
Figure 3:
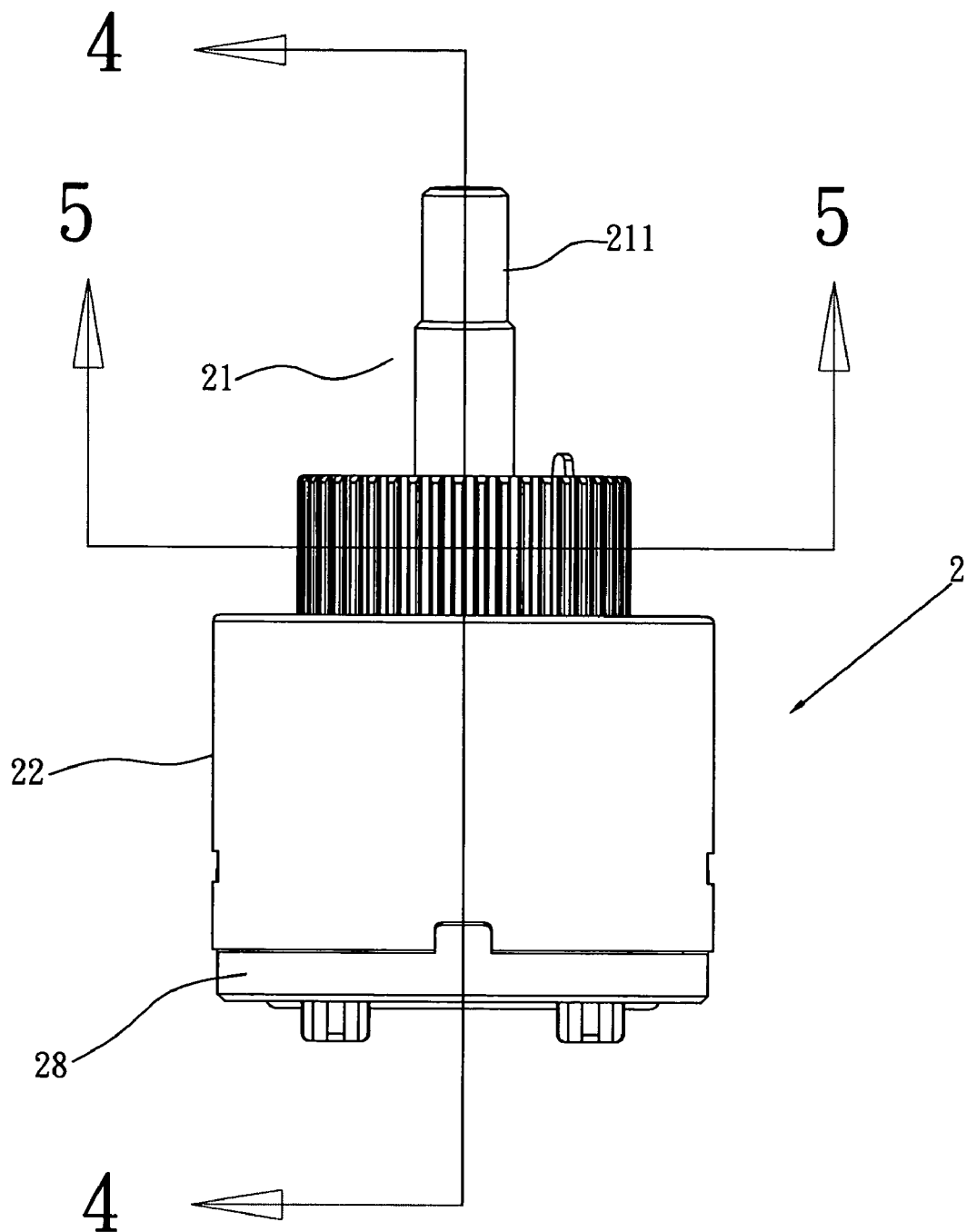
FIG. 3 is a plan view of the control valve as shown in FIG. 1.

Referring to the drawings and initially to FIGS. 1–4, a control valve 2 of a faucet in accordance with the preferred embodiment of the present invention comprises a base 28 having an inside formed with a water outlet 30 and having a top face and a bottom face each provided with a seal gasket 29, a lower ceramic block 27 mounted on the top face of the base 28 and having an inside formed with a conducting channel 273, a cold water inlet 271 and a hot water inlet 272, an upper ceramic block 26 mounted on the lower ceramic block 27 and having an inside formed with a conducting opening 261, a coupling block 25 mounted on the upper ceramic block 26, a bottom bushing 24 mounted on the coupling block 25, an inner barrel 23 mounted on the bottom bushing 24 and having an inner wall formed with a through hole 231, a housing 22 mounted on the base 28 and enclosed around the inner barrel 23, and a control shaft 21 mounted in the inner barrel 23 and having an upper end 211 protruding outward from the through hole 231 of the inner barrel 23 to combine with a handle (not shown) of the faucet.

The control shaft 21 has a lower end formed with a drive member 212 close fit on the inner wall of the inner barrel 23 to rotate the inner barrel 23. Preferably, the drive member 212 of the control shaft 21 has a spherical shape.

Figure 5:
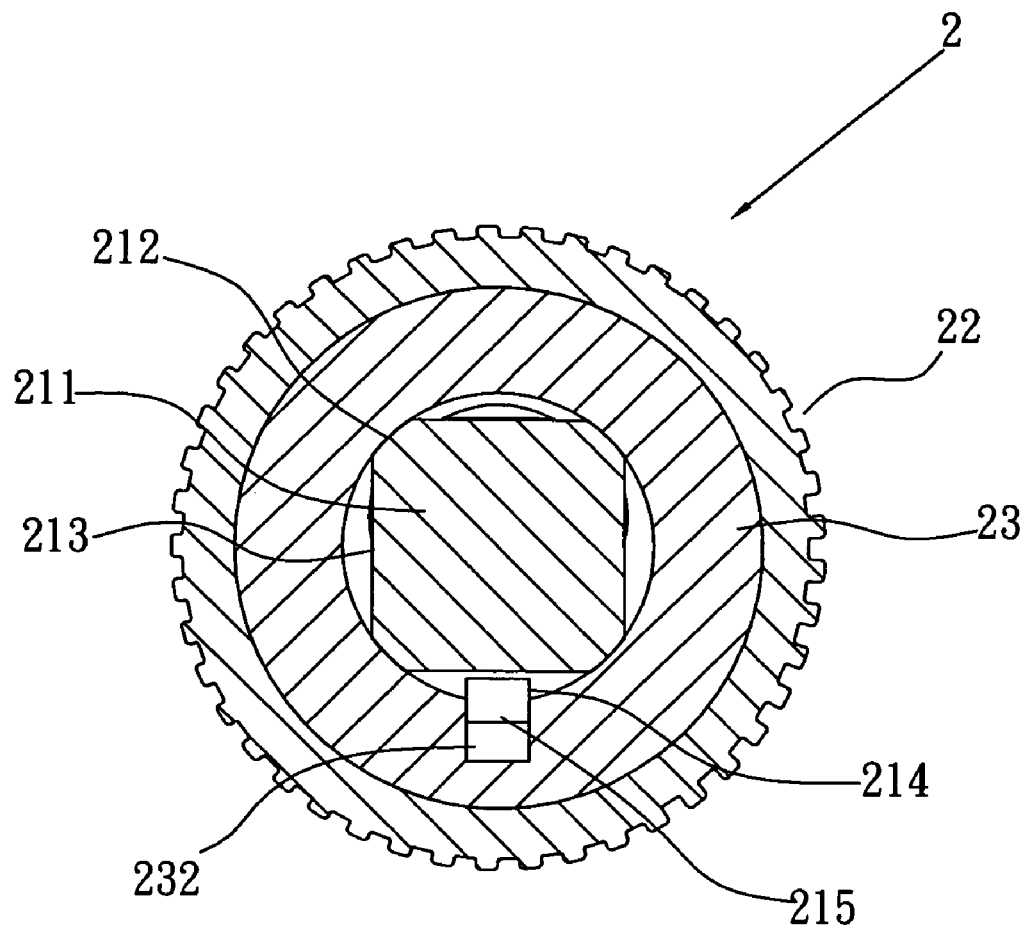
FIG. 5 is a plan cross-sectional view of the control valve taken along line 5—5 as shown in FIG. 3.

As shown in FIG. 5, the drive member 212 of the control shaft 21 has a peripheral wall formed with a plurality of flattened faces 213 which are equally spaced from each other and are arranged in a staggered manner. Thus, by provision of the flattened faces 213 on the peripheral wall of the drive member 212 of the control shaft 21, the contacting and rubbing area between the drive member 212 of the control shaft 21 and the inner wall of the inner barrel 23 is greatly reduced, so that the control shaft 21 is operated easily and conveniently, thereby facilitating a user operating the control shaft 21 of the control valve 2.

Figure 4:
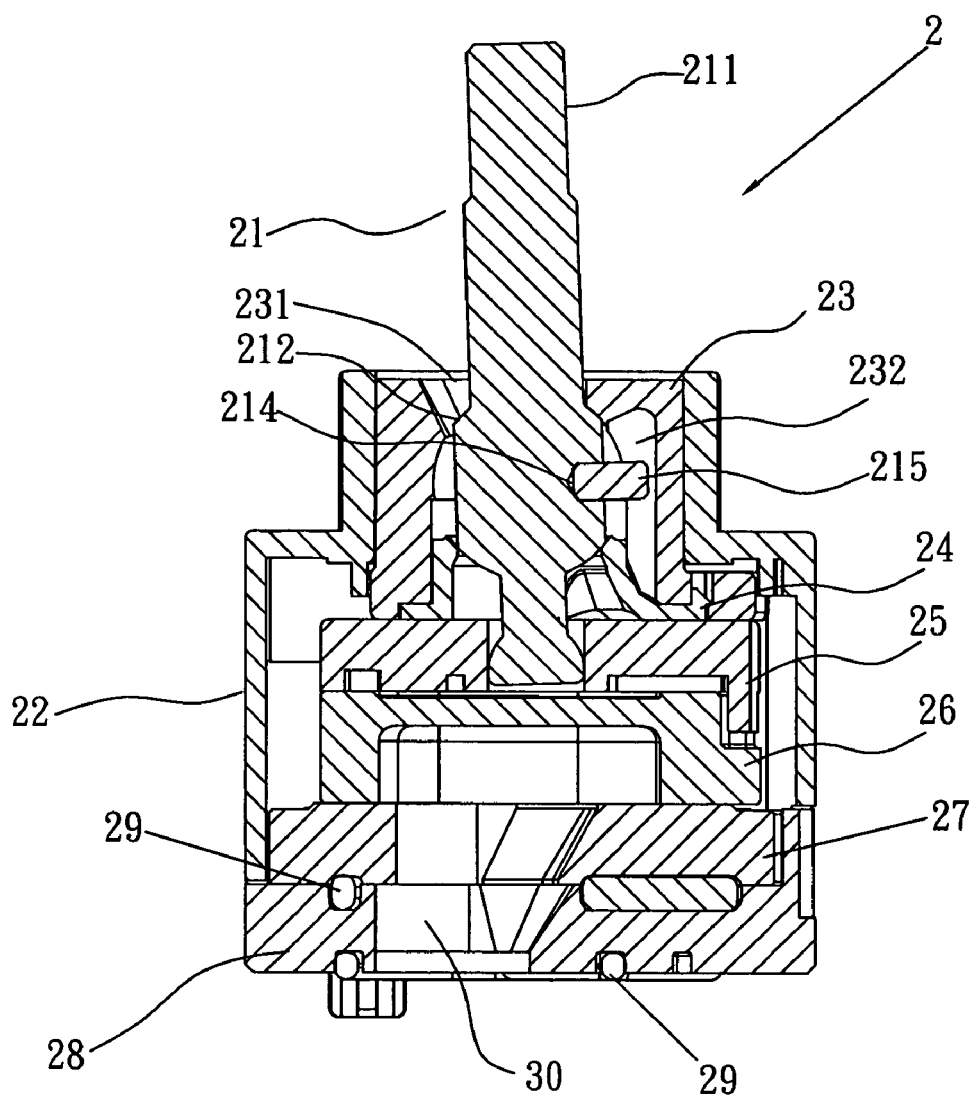
FIG. 4 is a plan cross-sectional view of the control valve taken along line 4—4 as shown in FIG. 3.

As shown in FIGS. 4 and 5, the control valve 2 further comprises a positioning pin 215 having a first end inserted into either one of the flattened faces 213 of the drive member 212 of the control shaft 21 and a second end inserted into the inner wall of the inner barrel 23 to secure the drive member 212 of the control shaft 21 in the inner barrel 23. Preferably, either one of the flattened faces 213 of the drive member 212 of the control shaft 21 is formed with a positioning hole 214, and the first end of the positioning pin 215 is inserted into the positioning hole 214. In addition, the inner wall of the inner barrel 23 is formed with a positioning recess 232, and the second end of the positioning pin 215 is inserted into the positioning recess 232.

In practice, the control valve 2 is mounted in the faucet, with the upper end 211 of the control shaft 21 being combined with the handle of the faucet. When the handle of the faucet is rotated to open the water flow, the upper ceramic block 26 is rotated and the conducting opening 261 of the upper ceramic block 26 is gradually moved to align with the cold water inlet 271 and the hot water inlet 272 of the lower ceramic block 27 in a staggered manner, so that the mixed water flow of the cold and hot water from the cold water inlet 271 and the hot water inlet 272 of the lower ceramic block 27 in turn flows through the conducting channel 273 of the lower ceramic block 27 and the water outlet 30 of the base 28 and flows outward from the faucet for use by a user.

Alternatively, when the handle of the faucet is rotated to close the water flow, the upper ceramic block 26 is rotated to interrupt the connection between the conducting opening 261 of the upper ceramic block 26 and the cold water inlet 271 and the hot water inlet 272 of the lower ceramic block 27, thereby stopping the water flow from the faucet.

Accordingly, the flattened faces 213 are formed on the peripheral wall of the drive member 212 of the control shaft 21 to reduce the friction between the drive member 212 of the control shaft 21 and the inner wall of the inner barrel 23, so that the control shaft 21 is operated easily and conveniently, thereby facilitating a user operating the control shaft 21 of the control valve 2. In addition, the control shaft 21 is operated smoothly, so that the control shaft 21 is not easily deformed during a long-term utilization, thereby enhancing the lifetime of the control shaft 21 and the control valve 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A control valve of a faucet, comprising:
    a base having an inside formed with a water outlet;
    a lower ceramic block mounted on the base and having an inside formed with a conducting channel, a cold water inlet and a hot water inlet;
    an upper ceramic block mounted on the lower ceramic block and having an inside formed with a conducting opening;
    a coupling block mounted on the upper ceramic block;
    a bottom bushing mounted on the coupling block;
    an inner barrel mounted on the bottom bushing and having an inner wall formed with a through hole;
    a housing mounted on the base and enclosed around the inner barrel; and
    a control shaft mounted in the inner barrel and having an upper end protruding outward from the through hole of the inner barrel, wherein:
    the control shaft has a lower end formed with a drive member rested on the inner wall of the inner barrel; and
    the drive member of the control shaft has a peripheral wall formed with a plurality of flattened faces.

2. The control valve in accordance with claim 1, wherein the drive member of the control shaft has a spherical shape.

3. The control valve in accordance with claim 1, wherein the flattened faces of the drive member of the control shaft are equally spaced from each other.

4. The control valve in accordance with claim 1, wherein the flattened faces of the drive member of the control shaft are arranged in a staggered manner.

5. The control valve in accordance with claim 1, further comprising a positioning pin having a first end inserted into either one of the flattened faces of the drive member of the control shaft and a second end inserted into the inner wall of the inner barrel to secure the drive member of the control shaft in the inner barrel.

6. The control valve in accordance with claim 5, wherein either one of the flattened faces of the drive member of the control shaft is formed with a positioning hole, and the first end of the positioning pin is inserted into the positioning hole.

7. The control valve in accordance with claim 5, wherein the inner wall of the inner barrel is formed with a positioning recess, and the second end of the positioning pin is inserted into the positioning recess.

\* \* \* \* \*